United States Patent [19]

Riglet et al.

[11] Patent Number: 5,631,975
[45] Date of Patent: May 20, 1997

[54] IMAGE SEGMENTATION DEVICE

[76] Inventors: Philippe Riglet, 22 avenue Descartes, Limeil-Brevannes; Lionel Bouchard, 34 rue Auguste Pégurier, Nice; Jaques-Ariel Sirat, 22 avenue Descartes, Limeil-Brevannes, all of France

[21] Appl. No.: 326,147

[22] Filed: Oct. 19, 1994

Related U.S. Application Data

[63] Continuation of Ser. No. 34,314, Mar. 22, 1993, abandoned.

[30] Foreign Application Priority Data

Apr. 14, 1992 [FR] France ............................ 92 04581

[51] Int. Cl.$^6$ ........................................ G06K 9/00
[52] U.S. Cl. ............................ 382/173; 382/282
[58] Field of Search ............................ 382/173, 174, 382/275, 274, 115, 107, 282, 278, 100, 270; 348/154, 415, 416; 395/118, 119

[56] References Cited

U.S. PATENT DOCUMENTS

| | | | |
|---|---|---|---|
| 4,236,180 | 11/1980 | Cayzac | 358/105 |
| 4,989,088 | 1/1991 | Wada et al. | 358/136 |
| 5,016,282 | 5/1991 | Tomono et al. | 382/2 |
| 5,086,480 | 2/1992 | Sexton | 382/18 |
| 5,109,435 | 4/1992 | Lo et al. | 382/48 |
| 5,177,608 | 1/1993 | Ohki et al. | 358/136 |
| 5,258,836 | 11/1993 | Murata | 358/136 |

FOREIGN PATENT DOCUMENTS 2663139  12/1991  France.

OTHER PUBLICATIONS

"Snakes: active contour models", in Int. J. Comput Vision, 1988, pp. 321–331 by M. Cass, A. Witkin and D. Terzopoulos.

"Model–Based Coding of Videophone Images", Electronics and Communication Engineering Journal, Feb. 1991, pp. 29–36.

Signal Processing: Image Communication, vol. 1 No. 2, 31 Oct. 1989, Amsterdam, NL, pp. 153–180, Gilde et al, "Coding of Arbitrarily Shaped Image Segments Based on a Generalized Orthogonal Transform".

"Model–Based Analysis Synthesis Image Coding (MBASIC) System For A Person's Face", K. Aizawa et al., Signal Processing: Image Communication, 1 (1989), pp. 139–152.

"Video Compression Makes Big Gains", IEEE Spectrum, Oct. 1991, vol. 28, No. 10, pp. 16–19.

*Primary Examiner*—Yon J. Couso

[57] ABSTRACT

Images having a moving pattern against a fixed or quasi-fixed background are segmented by determining a silhouette of the moving pattern, and forming a segmentation image filling the silhouette. On a pixel-by-pixel basis, differences are determined between the current image and previous images of a sequence, and compared with a threshold to form a binary image of background and useful zone. The boundaries of the useful zone are regularized, and irregularities in the useful zone and in the background are suppressed. A segmentation image is then formed within the silhouette.

21 Claims, 8 Drawing Sheets

IMAGE SEGMENTATION DEVICE

This is a continuation of application Ser. No. 08/034,314, filed Mar. 22, 1993, now abandoned.

FIELD OF THE INVENTION

The invention relates to a device for the segmentation of images which comprise at least one moving pattern against a fixed or quasi-fixed background and which are available in the form of digital signals corresponding to luminance or colour information on pixels. This invention may be used especially in a videophone image coding system for the automatic determination of the useful zone of the images to be transmitted and/or stored.

BACKGROUND OF THE INVENTION

Video conferences and video telephone conversations are activities which are undergoing a very fast development at the moment. Specialized journals indeed make mention of the presentation or marketing by numerous companies of videophones transmitting through ISDN (Integrated Switched Data Network) lines with a transmission rate of 48 to 64 kbits/second. This mode of transmission in a network, unfortunately, is still reserved to a fairly small circle of professional customers since the said videophones cannot be used for transmissions through the telephone network accessible to all private customers, which network has a very low transmission rate. A digitized image in fact comprises a very large quantity of information (one second of television requires, for example, a coding space of approximately 30 Mbytes, a still picture of CCIR format a coding space of approximately 1 Mbyte), which would have to be reduced by a very high compression factor.

One of the means which render it possible to reduce this quantity of information consists in a preliminary treatment of the initial pictures so as to select the most useful data to be transmitted (and/or stored). The article by W. J. Welsh, "Model-based coding of videophone images" in the journal "Electronics and Communication Engineering Journal", February 1991, pp. 29–36, proposes a preliminary treatment of this type. This document indeed describes the isolation from the pictures of the contour of the head and the shoulders, i.e. of the moving portion of the image sequence, through the use of an algorithm proposed by M. Cass, A. Witkin, and D. Terzopoulos in their article "Snakes: active contour models", in "Int. J. Comput Vision", 1988, pp. 321–331. This procedure, however, is comparatively complicated and the convergence of the algorithm, which proceeds by approximations which are to lead to a stabilization at the level of the contour of the head, is not assured.

SUMMARY OF THE INVENTION

The invention has for its object to avoid these convergence problems and to propose a device for the preliminary treatment of the initial images which renders possible a simpler and quicker operation in the selection of the most interesting data to be transmitted and/or stored.

To achieve this object, the invention relates to a device for the segmentation of images as defined in the opening paragraph of the present description which is in addition characterized in that it comprises:

(1) means for determining a silhouette by calculation, at a luminance of the background which is substantially even, from a difference in luminance between the present image and at least one image taken in the sequence of images preceding the said present image, and subsequently by a comparison of this difference with a threshold with the object of forming a binary image of which either the one or the other of two possible luminance values, corresponding to the background of the image and its useful zone, respectively, is adopted for each pixel depending on the value of the said difference in relation to the threshold;

(2) means for suppressing irregularities which may affect the useful zone;

(3) means of restoring a segmentation image formed by a uniform background and the representation of the pattern derived from the original images by means of the said means for determining a silhouette and the said means for suppressing irregularities.

The selection of information rendered possible by such a structure is based on the assumption that the useful zone of the image (face and chest in the case of the particular applications mentioned above) is mobile against an immobile background and, starting from this assumption, is based on the principle of a transmission (and/or storage) which is essentially limited to those bits of information which describe the movement of the mobile elements. The proposed device thus forms a highly effective link in the realisation of an overall system for the compression of images in the envisaged application of transmission at a very low data rate and/or storage with a high data compression rate.

An image segmentation through contour detection is already known, for example, from the document FR-2663 139. The device described therein, however, operates by an investigation of local structural characteristics of the contour which separates the constituent parts of the segmented image and not, as in the present case, by a progressive treatment of the image zones situated on either side of their separating contour.

BRIEF DESCRIPTION OF THE DRAWINGS

The special properties and advantages of the invention will now be described in more detail in the following description which is given with reference to the annexed drawings, in which:

FIG. 7 shows the six degrees of freedom on a face according to which the movements of this face will be described, while

DESCRIPTION OF PREFERRED EMBODIMENTS

Figure 1:
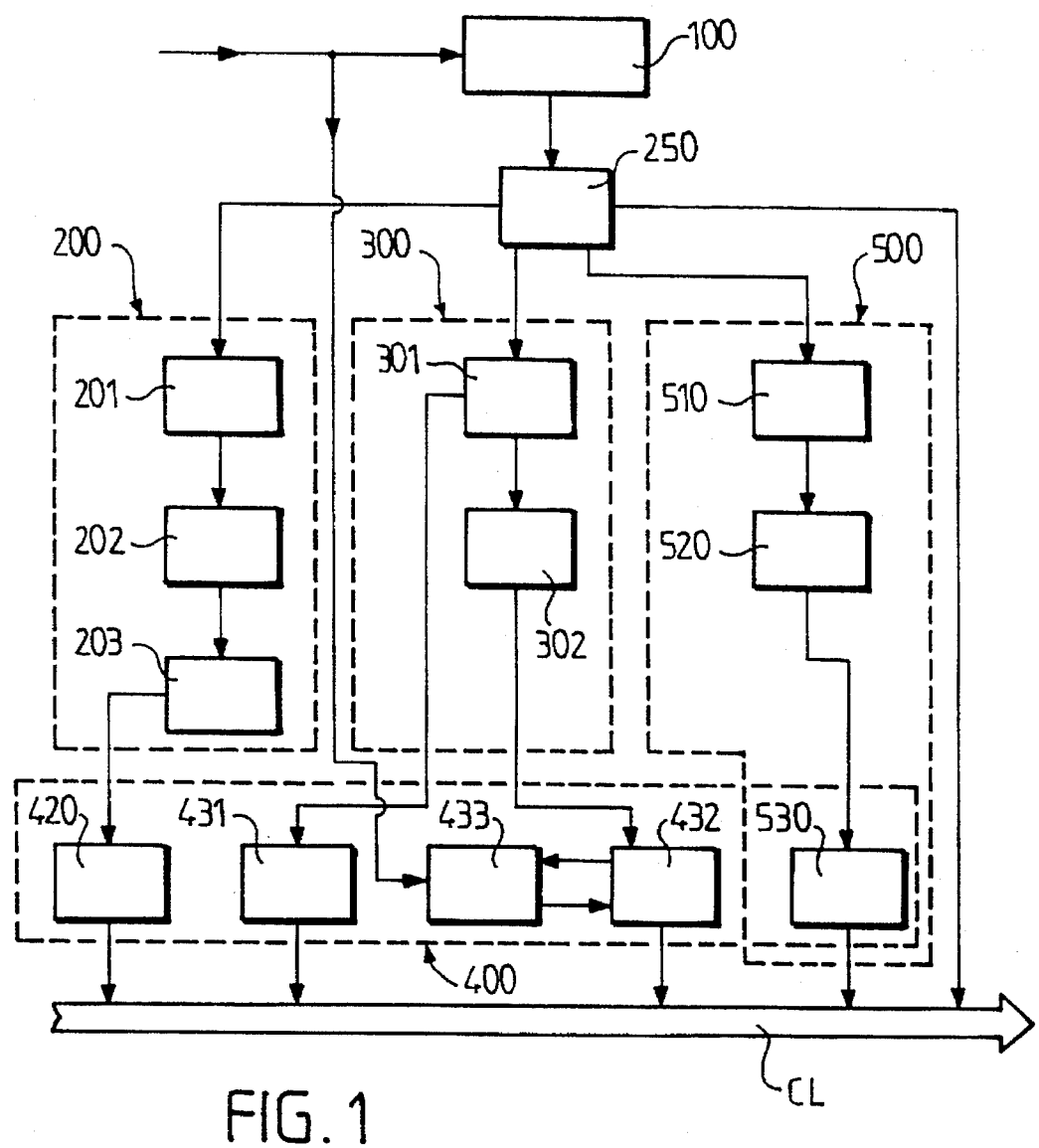
FIG. 1 shows an embodiment of a subassembly for coding videophone images, comprising a device for image segmentation according to the invention.

A videophone is a device which renders it possible to those having a telephone conversation to obtain in addition an animated picture of their discussion partner(s) on a screen. Two types of information must be recognizable on the screen: the person and the background. In the embodiment described here, it is supposed that the images to be transmitted are formed by one moving person and a fixed background (or quasi-fixed, which term refers to a background which, for example, is subject to an image shift). In addition, the format of the said images here is of the type defined by the CCITT (Consultative Committee for International Telephony and Telegraph) as the standard image format for a transmission through networks with a very low data rate, i.e. the CIF (Common Intermediate Format), adopted for visual telephone and video conference applications, with the object of finding a solution for the present incompatibility of television standards in the world.

In the CIF format, the luminance signal comprises 288 lines of 360 pixels each, and the chrominance signal comprises 144 lines of 180 pixels each. A CIF video image is thus formed by 155,520 pixels. In an imaging process which provides, for example, 15 images per second, 2,332,800 pixels would thus have to be transmitted, each coded by means of 8 bits. The transmission speed for the transfer of a CIF image is thus higher than 18 Mb per second, which is not exactly a low data rate and renders a compression of data absolutely necessary. Alternatively, a second picture format has been defined for rendering possible the use of less expensive equipment. This format, which is given the designation QCIF (Quarter CIF) halves the luminance information definition (now comprising 144 lines of 180 pixels each) and the chrominance information definition (now comprising 72 lines of 90 pixels each), with an imaging frequency of 7.5 images per second. In the following description, certain results or certain values will be defined either in the CIF standard or in the QCIF standard, or also in a third format, for example, 682×512 pixels (format 4/3). Nevertheless, the formats envisaged here by no means form limitative examples as regards the present invention (the 4/3 television format of 720×576 pixels could very well also be used). Moreover, it would also seem that a frequency of 10 images per second still represents a satisfactory compromise between the visual comfort of the speakers and the necessary reduction of the data rate.

The ensuing description here relates to a coding and decoding assembly for images destined for such a transmission at a very low data rate and/or storage with a high compression rate of the data corresponding to these images, which assembly comprises on the one hand a subassembly for coding the videophone images and on the other hand a subassembly for decoding the images thus coded. The subassembly for coding videophone images described here with reference to FIG. 1 receives at its input a sequence of video images as defined above. These images were obtained, for example, with a CCD camera with an original format of 512×512 picture elements or pixels. This camera here supplies a signal in shades of grey at 256 levels (pixels coded by 8 bits), but it would also be possible to process colour images and images of a different format.

Figure 2:
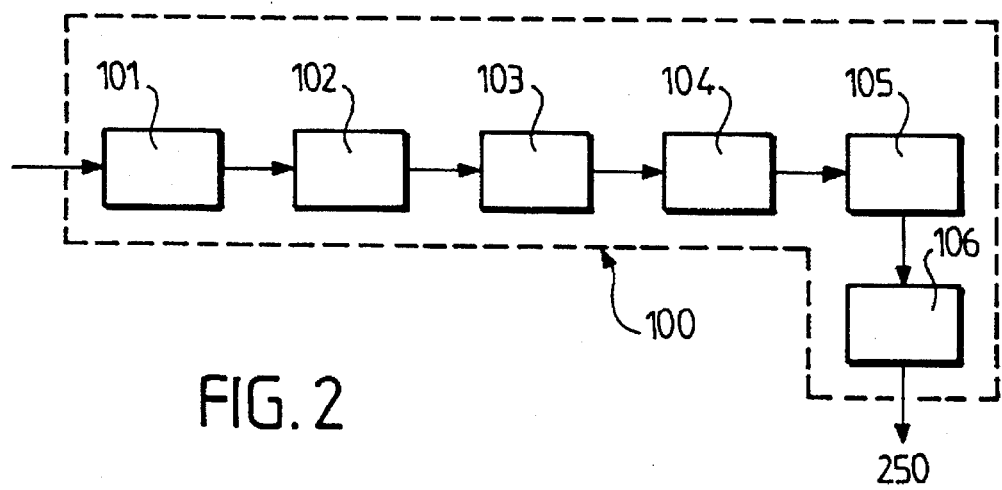
FIG. 2 shows an embodiment of this segmentation device.

The sequence of images of CIF format thus presented to the input of the subassembly is fed to a segmentation device 100. In the embodiment described here, the object is to distinguish automatically the zone corresponding to the face of the speaker (and the upper part of the chest) from the fixed background. This distinction is based on an analysis of a succession of images, for example, between approximately 10 and 20, of which a number n is retained here, for example, the images numbered 4, 8, 12 and 16, represented by $I1, I2, I3, I4$, respectively (in this order, the images stored should be sufficiently wide apart for catching the displacements optimally, but not too far, so as to avoid an overdimensioning of the silhouette in the case of major movements). As FIG. 2 shows, the device 100 comprises first a circuit 101 for determining the silhouette by a calculation of the difference (here pixel by pixel) between these images in accordance with the following formula for obtaining an average difference which renders it possible to take into account fluctuations in the movements of the head and chest:

$$DIFF(i,j) = |I_4(i,j) - I_3(i,j)| + |I_4(i,j) - I_2(i,j)| + |I_4(i,j) - I_1(i,j)|$$

in which expression i and j correspond to the number of the present pixel in the lines and the columns, |.| is the symbol for "absolute value of", and DIFF is the average difference thus calculated. This difference is then compared with a threshold THRE1 (of a few units, for example 4) for separating the useful signal from the background noise: if the difference is greater than the threshold, DIFF(i,j)=255 is taken (maximum in the scale of the 256 luminance levels from 0 to 255), the corresponding pixel being considered a moving pixel in the succession of images considered and thus belonging to the person, if not, the present pixel is considered static and is thus given a zero luminance DIFF (i,j)=0. This calculation of a difference through suppression of the background on the basis of the movement obviously implies that the ambient luminance, corresponding to the background, remains constant during this succession of images, otherwise a variation in luminance could be confused with a real movement.

The circuit 101 is followed by a noise suppression circuit 102. During the determination of the silhouette, small variations in luminosity of the background may remain, affecting several isolated pixels situated outside the zone of the face. The circuit 102 then renders it possible to examine for each pixel P of the image the luminance of the adjoining pixels contained, for example, in a block centred on this pixel P, and thus to achieve an average for these surroundings of P: if the majority of the pixels of the block are white, P is given the luminance level 255, if not, its luminance is considered equal to 0. This operation is represented by the following expression:

if $\Sigma DIFF(k,l)$ > $THRE2$
→ $\Sigma DIFF(k,l) = 255$
if $\Sigma DIFF(k,l)$ < $THRE2$
→ $\Sigma DIFF(k,l) = 0$ in which expression the letters k, l correspond to the line number and the column number, respectively, of the adjoining pixels of P(i,j), and THRE2 is the threshold value which renders it possible to take a majority decision after the luminance average has been determined. When this operation has been completed, the zone corresponding to the background is filled with black pixels, whereas that corresponding to the person is for the major part filled with white pixels.

A circuit 103 for suppressing discontinuities then renders it possible to make the silhouette of the person homogeneous through the elimination of any black pixels which lie inside it. This suppression is realised, for example, by scanning the image line by line and determining for each line that segment whose two ends coincide with the two contours on the left and right of the person, and then by assigning the luminance value 255 to all pixels of this segment. The zone which will thus appear in white must show a continuous profile. The object thus is to eliminate from among the outermost points of these segments those points which would introduce a discontinuity into the profile. More precisely, if we name the outermost points of the segment of the current line $P_L(i,j)$ and $P_R(i,j)$, i.e. the first white pixel and the last white pixel encountered on the present line being scanned (in other words again, the first pixel encountered on this line starting from the left and ditto starting from the right of the screen, respectively), this suppression of deviating points which lead to discontinuities is effected while taking into account the greater or smaller inclination of the contour of the silhouette of the person in relation to the said line being scanned, by means of a test of the discontinuities between the preceding line j−1 and the present line j. This operation may be expressed as follows: depending on whether the luminance difference between the pixels $P_L$ (or $P_R$, as the case may be) of row j−1 and j is greater or smaller than a given threshold THRE3, the point $P_L$ (or $P_R$) is considered invalid and is eliminated (luminance suppressed to the value 0), or on the contrary is considered valid, and a similar test follows for the lines j and j+1.

The threshold THRE3 represents the discontinuity value which is accepted between two successive lines of the zone of the person. This value depends on the region considered along the person's contour:

where the profile is very much rounded (upper part of the head) and the said inclination thus corresponds to a small angle or, on the contrary, is close to 180°, fairly great continuities can be accepted from one line to another, and a value of the order of a few dozen pixels may be taken, for example, for THRE3;

at the centre of the image, in the region corresponding to the temples, the cheeks and the neck, this inclination is close to 90°, or in any case far removed from the extreme values 0° and 180°, and the discontinuities from one line to the next are small, the value of THRE3 then being of the order of a few pixels;

for the bottom of the image, in the region of the shoulders and the chest, the inclination may again have the extreme values referred to above and strong discontinuities between successive lines obtain again, of the order of several dozens of pixels.

Finally, a circuit 104 for suppressing irregularities in the contour separating the silhouette from the background is connected to the circuits 102 and 103 for carrying out a smoothing operation. Here again, various suppression methods could be used, for example, morphological filtering. As in the case of circuit 102, the choice was made for establishing an average and making a comparison with a luminance threshold THRE4, more precisely by considering each white pixel not far removed from the contour and testing the luminance of its neighbours, and by assigning to it the majority luminance in this neighbourhood.

After these consecutive operations for suppressing irregularities which may affect the background, the silhouette and the contour separating them, the image segmentation has been completed and a binary image is available from that moment on, whereby a value for the expression DIFF(i,j) corresponds to each pixel P(i,j). This binary image is now used by an image substitution circuit 105 for defining the image of the zone of the person in shades of grey (or in colours, as the case may be). This definition is realised in the following way: if DIFF(i,j)=255, the original image is restored at the location of the binary image, if not, the background is given the value 0 for each pixel with DIFF (i,j)=0.

Figure 3:
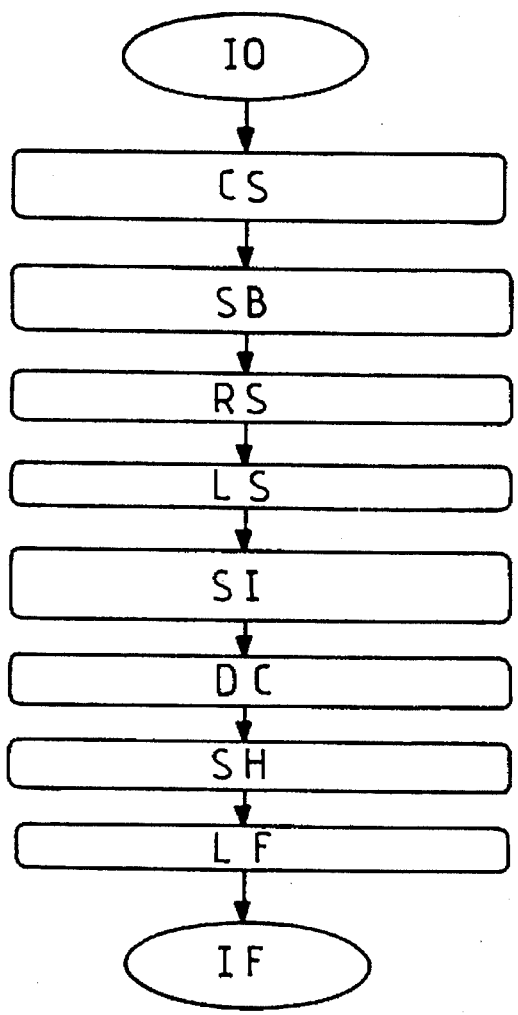
FIG. 3 is a flowchart which summarizes the various operations carried out in the treatment of the images to achieve the said segmentation.

This image in shades of grey or colours and without background is subjected to a final treatment by means of a circuit 106 which suppresses motional effects. In fact, when the original image is superimposed on a different image which results from a combination of several images of the input image sequence, a kind of halo or superdimension will appear between this original image and the said differential image (which is necessarily larger), the thickness of this halo corresponding to the movements carried out by the person during the takes leading to the succession of images used for the preceding treatments. To eliminate this halo, the circuit 106 comprises a contour detector which will call up the external edge of the halo (i.e. the contour of the image without background) and the internal edge thereof (i.e. the actual contour of the person) simultaneously. This detector of the circuit 106 detects two contour points on the left of the person and two other contour points on the right for each line scanned in succession, and then assigns a zero luminance to pixels lying between these two contour points on the left as well as to the pixels lying between these two contour points on the right. After a possible final smoothing, an image representing the real profile of the person is now available. FIG. 3 shows a flowchart which summarizes the operations carried out in succession here for distinguishing the person from the background, these intermediate operations being, starting from each original image IO, as follows: creation of the silhouette by differentiating between several images (CS), noise suppression (SB), filling up the silhouette (RS), smoothing of this silhouette (LS), segmentation of the image without background (SI), detection of the contour (DC), halo suppression (SH) and final smoothing (LF), thus leading to the image without background: IF.

The system described also comprises, connected in parallel, a device 200 for constructing a tridimensional model of the contents of the useful image zone, and a device 300 for updating the main parameters of the definition of the said model, and also a device 400 for coding information supplied by the devices 200 and 300. The device 200 is to provide an initial calibration through adaptation of a basic tridimensional model in the application described here, which consists of the localization and following of a person in an animated sequence of videophone images. The device 300 then serves to update this model, taking into account movements which take place during the said sequence. A commutator 250, whose operation will be described further below, is provided at the output of the device 100 for controlling the transition between the operation of the device 200 and the operation of the device 300.

Figure 4:
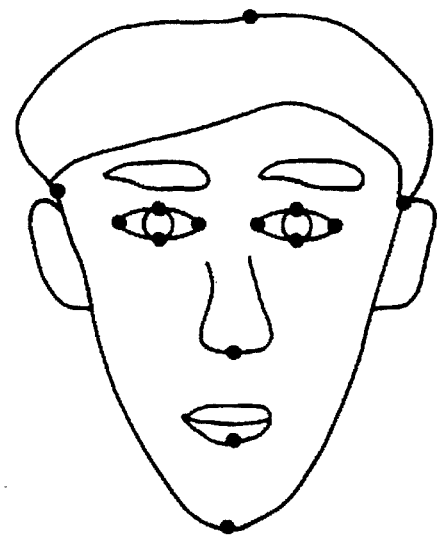
FIG. 4 shows the main zones where the reference points defining the characteristic features of a face will be localized in view of the model calibration operations and the displacement tracking to be described below.

The device 200 receives as its information digital video signals corresponding to an animated portion of a sequence of images and selected by segmentation, for example, according to the segmentation principle described above, and comprises first of all a circuit 201 for extracting points of reference in the said useful zone of images to be transmitted. To obtain a true or at any rate satisfactory reproduction of the face of the person occupying the said useful zone on the basis of a tridimensional geometric model, in fact, it is important first of all to determine the principal characteristic points of the face present in the sequence of images (i.e., as shown in FIG. 4, the crest of the head, the temples, the eyes, the nose, the mouth, and the chin) which will render possible the initial calibration of the tridimensional model (followed by tracking of the displacement, as will be seen further below). The document "Model-based analysis synthesis image coding (MBASIC) system for a person's face", K. Aizawa et al., Signal Processing: Image Communication, 1 (1989), pp. 139–152, describes an embodiment of such an operation aiming at the eventual synthesis of an output image on the basis of a tridimensional model.

For this extraction of points of reference, accordingly, the circuit 201 considers the image of which the background has been suppressed, and carries out a scan, for example a vertical scan, of this image to determine the first characteristic point, which is the crest of the head and of which the ordinate corresponds to the maximum ordinate of the image without background. The characteristic points of the eyes (corners of the eyes, upper point, bottom point) are subsequently determined by segmentation in a window automatically centred on the zone of the eyes, and defined for this purpose on the basis of especially the position of the crest of the head, while taking into account the thickness of the hair portion, which is very variable from one person to another, so as to place this window accurately below the zone corresponding to the hair and to centre it effectively at the level of the eyes.

The segmentation method is based on thresholding at several levels, the thresholds chosen being equal to minimum values of the luminance histogram in the window. More precisely, an initial operation should first be carried out to determine the outer edges of the region corresponding to the hair by segmenting a window of which the upper edge is given by the crest of the head by the histogram method, the number of histogram levels being adjusted such that the luminance of the hair appears to be constant and that this zone of the hair accordingly is perceived as a single region. The lower limit of the hair region may then be chosen as a reference for defining in its turn the window of the eyes. If no hair is detected (in the case of a bald person), it is possible to define a probable position of the window of the eyes from the position of the crest of the head alone by choosing a window of sufficient width then. The window of the eyes being thus defined, the second operation consists in segmenting into regions, again by the histogram method, in order to ascertain the zone of the actual eyes, which is richer in contrasts than the skin (it is obviously presupposed here that the lighting conditions of the person are sufficiently correct so that there are no shadows which can interfere with the segmentation). The number of histogram levels is then automatically adjusted to render possible a localization of the four characteristic points of each eye, the coordinates of which are provided by finding the extreme values for the abscissa and the ordinate of the shape obtained after segmentation. It is also possible to add to this localization of the eyes a localization of the temples, which defines here the two points belonging to the extreme left and right contours of the person, at an ordinate chosen approximately at the level of the eyebrows (which may alternatively correspond substantially to the ordinate of the characteristic upper points of the eyes), the corresponding abscissa being determined by the outer contour points of the image without background through scanning of the line corresponding to this ordinate.

Starting from the eyes thus localized, a searching window for the mouth is defined through translation of that containing the eyes. If the contrast around the mouth is weak, it is preferable to use not the segmentation method, which is comparatively inprecise in this case, but a contour detection method which renders it possible to obtain the general shape of the mouth and to localize a characteristic point situated at the minimum of the contour indicating the lower lip. From the localization of the eyes and the mouth it is then possible to deduce a window for finding the nose, the lateral edges of which are substantially vertically below the inner points of the eyes while the lower and upper edges adjoin those of the windows relating to the eyes and the mouth, after which it is possible to deduce the position of the nostrils by segmentation of this nose window by horizontal scanning of this window, assuming that the face of the person is oriented towards the camera with an illumination which does not create any disturbing shadows.

Finally, a window for finding the chin can be found through translation of that of the mouth. Here again, the contrast around the chin may be weak and instead of the segmentation method or the contour detection method, a method similar to that for determining the silhouette as used in the beginning is preferred, which operates by obtaining a differential image on the basis of several images of the sequence, noise suppression, and horizontal scanning for determining the minimum of the arc obtained which corresponds to the lower tip of the chin.

Figure 5A:
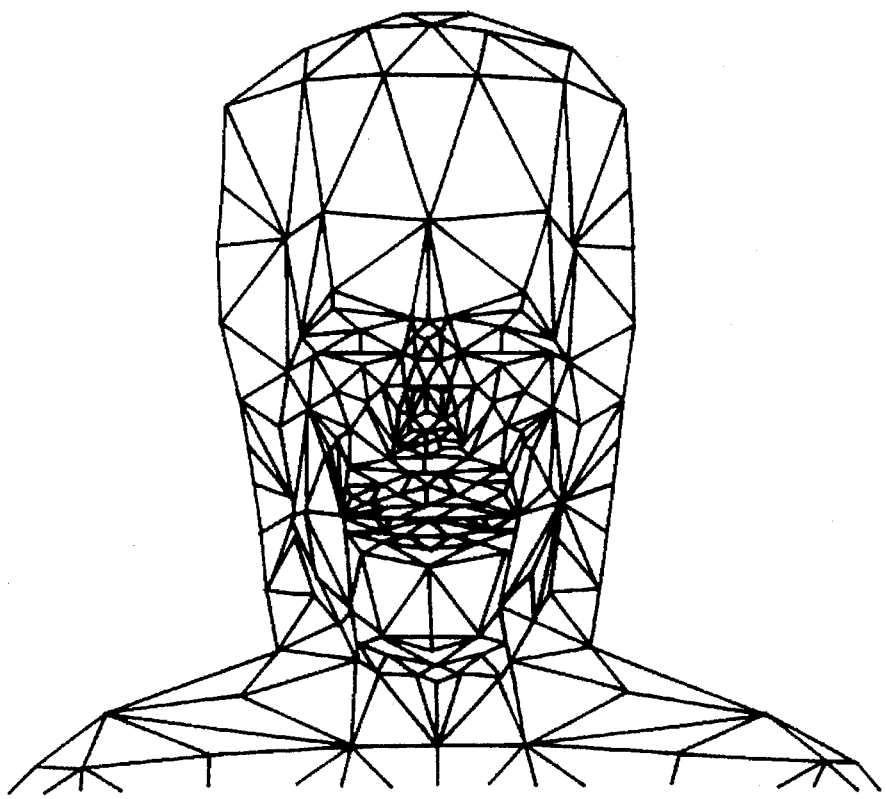
FIG. 5A shows an example of a tridimensional model with facets on which the adaptation to the original images is based.
Figure 5B:
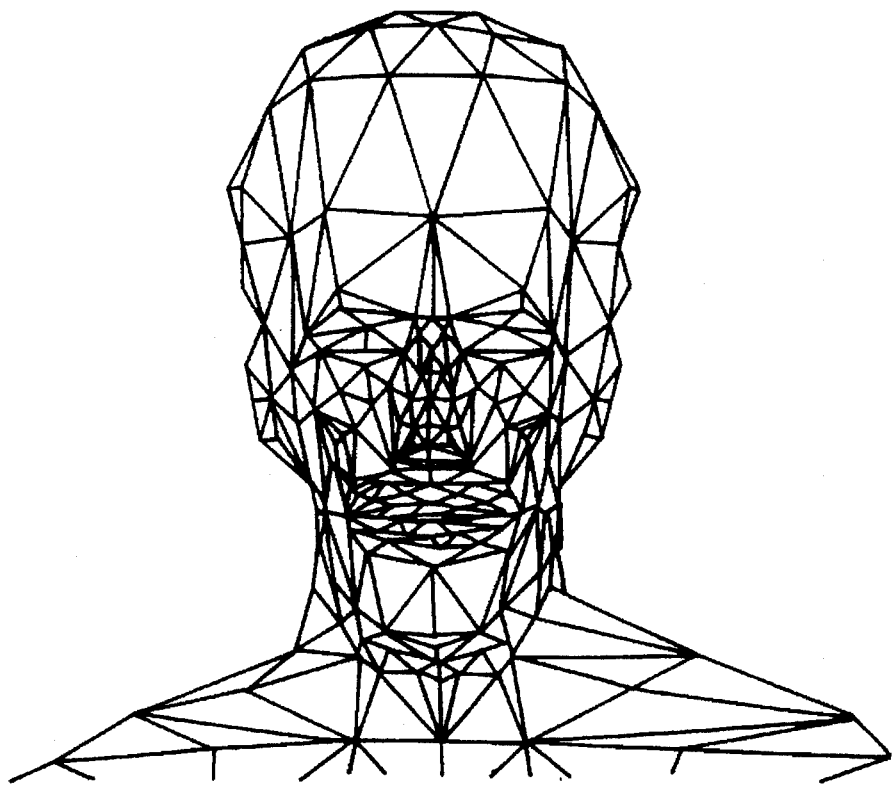
FIG. 5B shows the same model after the said adaptation has been carried out for an example of a real face which has been accurately determined.

The circuit 201 for extracting the reference points is then followed by means 202 for adapting a tridimensional base model. This model, as indicated in the document "Signal Processing: Image Communication" cited above, is formed by a lattice of numerous triangular facets. Each of these facets is defined, so as to distinguish it from the others, by a facet number FN and three nodes with the numbers V1, V2, V3 situated at the three tips of the triangle. The coordinates $x_v$, $y_v$, $z_v$ associated with these nodes are defined in a reference frame forming part of the model. An example of such a basic model is shown in FIG. 5A, while FIG. 5B shows the same model after the adaptation to an accurate determined actual face has been carried out.

This model is pictured on the screen in a system of screen coordinates $x_s$, $y_s$, $z_s$ in which the axis of the abscissae is horizontal, the axis of the ordinates vertical, and the z-axis perpendicular to the screen (the coordinates $x_s$, $y_s$, $z_s$ are derived from the coordinates $x_v$, $y_v$, $z_v$ by a matrix transformation of the classic type), and is to be adapted to the sequence of images, i.e. the said coordinates will be modified on the basis of the characteristic points previously defined. The adaptation means provided comprise first of all a circuit 202 for alignment with the original image and for achieving the correct scale. The reference marks for this alignment here are, horizontally, the centre of the segment comprising the two temples and, vertically, the crest of the head. The displacements for aligning the model with the original image are, therefore:

(a) for the abscissa:

$$dx = \frac{1}{2}[(x_v(RT) - x_v(LT)) - (x_c(RT) - x_c(LT))]$$

(b) for the ordinate:

$$dy = y_v(HT) - y_c(HT)$$

in which:

$x_v$ and $y_v$ have already been defined;

RT and LT refer to the temple on the right and the temple on the left, respectively, and HT to the crest of the head;

$x_c$ and $y_c$ represent the coordinates of the characteristic point considered from among those previously defined.

After alignment, the model is dilated so as to be shown at the same scale as the person, for which the characteristic points of the temples, the eyes, and the chin are used, in accordance with the following expressions:

$$DIL(X) = (x_c(RT) - x_c(LT))/(x_v(RT) - x_v(LT))$$

$$DIL(Y) = (y_c(CH) - y_c(EY))/(y_v(CH) - y_v(EY))$$

in which DIL(x) and DIL(Y) represent the multiplication factors to be applied to the coordinates of the model, and CH and EY refer to the chin and to the eyes, respectively. If so desired, $y_c(EY)$ may be replaced by a value $y_{cm}(EY)$, which represents the average value of the coordinates $y_c(EY)$ for various characteristic points chosen around the eyes. In fact, by taking an average value instead of the coordinate of a single point, the possible error on the ordinate of one of these characteristic points considered in isolation is minimized.

The circuit 202 is then followed by a circuit 203 for adjusting the expressive zones and the profiles. In fact, the alignment and the achievement of the correct scale have established a correspondence between the model and the image which remains fairly rough since only the positions of a few points have been determined. To restore also the expressive zones and the profiles of the face, all nodes of the tridimensional model must be adjusted for an optimal representation of the original image. For each node $V_i$, the tridimensional model contains not only the coordinates $x_{vi}$, $y_{vi}$, $z_{vi}$, but also a number or label indicating to which zone of the face or chest the said node belongs (side of the head, cheeks, shoulders, nose, eyes, mouth etc.). A specific treatment may in fact be carried out for each of these nodes, depending on its zone:

(a) outer profile, sides of the head, cheeks and shoulders: these nodes are adjusted against the exterior contour of the previously determined image without background. Thus, a displacement DEPL(x) along the x-axis must correspond to each node of the outer profile of the tridimensional model, from which a new coordinate $x_v$ for the node $V_i$ is deduced. As for the nodes at the side of the head, the same type of alignment is carded out on the ranges of pixels adjoining the outer profile, with in addition a slight lateral adjustment SMSH($V_i$) suitable for each node and taking into account the curvature of the head as well as an approximate shape of the ears. The new coordinate $x_v$ of the node $V_i$ in question is then derived from this. The displacement DEPL(.) is given by the expression:

$$DEPL(x(V_i)) = x_{CTR}(y_s(V_i)) - x_s(V_i) + SMSH(V_i)$$

in which $X_{CTR}(.)$ represents the abscissa of the contour of the image without background for the ordinate corresponding to the node $V_i$, and $x_s(V_i)$ is the abscissa $x_s$ for the node $V_i$. A similar procedure is used for the nodes of the cheeks and the shoulders.

(b) nose, eyes and mouth: these nodes are adjusted in that their approximate alignment in relation to respective characteristic points is achieved, in accordance with the following expressions:

$$DEPL(y(NN)) = y_{c1}(NN) - y_s(NN)$$

$$DEPL(y(BM)) = y_{c1}(BM) - y_s(BM)$$

$$DEPL(y(YE)) = y_{c1}(YE) - y_s(YE)$$

in which DEPL(.) designates the displacement of the node corresponding to the nose (NN), to the mouth (BM), or to the eyes (YE), $Y_{c1}(.)$ is the ordinate of the characteristic point thus considered, and $y_s(.)$ is the screen coordinate of the corresponding point for the tridimensional model, again for the nose, mouth or eyes, as applicable. An approximate translation is subsequently carried out for the nose, mouth, or eyes, defined by the said corresponding displacement, and the new coordinate $y_v$ of the node $V_i$ in question is derived therefrom.

Figure 6:
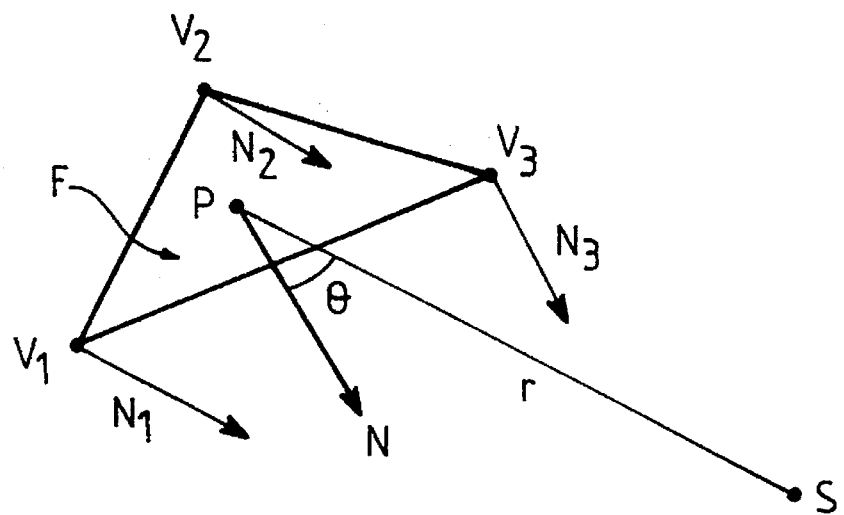
FIG. 6 illustrates the fact that each facet of the tridimensional model may be shaded subject to the illumination which it supposedly receives from a luminous point source.

This adjustment of the tridimensional model may yet be perfected through the addition of a shadow effect. It is supposed for this purpose, for example, that an illumination is provided by a point source S (see FIG. 6) placed at a distance r from the facet F (with vertices $V_1$, $V_2$, $V_3$) which one wants to shade, and that this illumination will vary with the orientation of the facets relative to the direction of the source. If I(AMB) is the ambient illumination value of the scene and I(INC) is the luminance value coming directly from the source, the luminance value I(OMB) at any point P with coordinates (x, y) of the facet F in question is then given by the following relation:

$$I(OMB)(x,y) = I(AMB) + (I(INC)/r) \cdot \cos\theta$$

in which, as indicated in FIG. 6, the angle $\theta$ is the angle enclosed by the segment PS with the perpendicular N to the facet. In order to guarantee a continuity of luminance among the facets, it is possible to define this perpendicular N artificially in the following manner: first a perpendicular is defined in each vertex $V_1$, $V_2$, $V_3$ of the facet F in question which is the average of the perpendiculars in these vertices to the facets adjacent to F, then the perpendicular to F in any point of F is calculated by interpolation of the three perpendiculars $N_1$, $N_2$, $N_3$ thus defined in each vertex.

The coding device 400 arranged at the output of the devices 200 and 300 comprises, as will be seen, various coding subassemblies, first of all a circuit 420 for coding various items of information available at the output of the adjustment circuit 203, i.e. the new coordinates of the nodes of the tridimensional model and quantities called texture coefficients associated with each facet F. If the composed image which it is the object to obtain takes into account shadow effects, this image will be defined for each facet on the basis of the product of the relevant texture coefficient and the shadow coefficient associated with the said facet, which can be rendered by the following expression:

$$I(SYNTH)_F = I_{OMB}(F) \times CT(F)$$

the texture coefficient CT(F) for the facet F being itself determined during the initial calibration on the basis of the original image I(SOURCE)$_F$ seen en face:

$$CT(F) = I(SOURCE)_F / I_{OBM}(F)$$

This is true when the coding subassembly is so constructed that it transmits to the decoding subassembly a table in which all the texture coefficients (calculated as indicated above) for all facets are grouped together, upon which the said decoding subassembly reconstructs the complete image in accordance with the above expression, taking into account consecutively the luminance of each point. Thus it is sufficient, if a sequence of several images is to be coded, to transmit the table of texture coefficients corresponding to the first image only once. Then, as the person moves, the displacements of the model lead to deformations of the facets which form this model, but the textures of these facets are calculated by interpolation of initial texture coefficient values.

An alternative embodiment of the coding subassembly is possible in which not the table of texture coefficients is transmitted, but simply the corresponding portion of the original image coded, for example, according to a digital video standard of the JPEG type—Joint Photographic Experts Group—which is adapted to the compression and to the coding of data belonging to still images. This standard, described in numerous documents, for example, in the article "Video compression makes big gains" in the journal IEEE Spectrum, October 1991, vol. 28, no. 10, pp. 16–19, implies that each video component of the image is divided into blocks which are then transformed by an orthogonal transformation of the DCT type (Discrete Cosine Transform) into coefficients representative of the contents in the frequency of these blocks, and which themselves are quantified and subsequently coded. With this alternative embodiment, the information necessary for calculating the texture coefficients (which is only separated at the decoding end) is transmitted simultaneously with, obviously, always the portion corresponding to the background of the images. The coding cost in this case is of the order of 0.5 bit/pixel. In this case again, as in the case of the preceding embodiment, it is sufficient for coding a sequence of several images to carry out the JPEG type coding only once during the movement of the person. This method in addition renders it possible to transmit the entire image during the initialization phase, i.e. an image of the background at the same time as the texture information.

As for the new coordinates of the nodes of the model, it would be possible to transmit and/or store these coordinates themselves with the object of decoding them. It is more efficient for the transmission rate, however, to consider that the original coordinates of the nodes of the tridimensional model are already known and storied at the decoding end, so that it suffices to provide, for transmission and/or storage, only the values of the differences between these original coordinates and the new calculated values. When these differences are coded with a sufficient number of bits, for example 6, it is possible to handle major node displacements (64 pixels in 6 bits). The calibration is carried out during a limited period corresponding, for example, to a given number of images of the sequence. This period may be defined by the commutator 250 shown in FIG. 1, which switches from the device 200 to the device 300 after this period has elapsed. A mode signal is associated with each position of the commutator 250, which signal must be transmitted simultaneously with the other coded data so that the decoding system can eventually recognize the nature of the signals it receives. When this initial calibration and the coding of the calibration information have been completed, as indicated above, the device 300 will enable the updating of the said information in relation to the tridimensional model.

Figure 7:
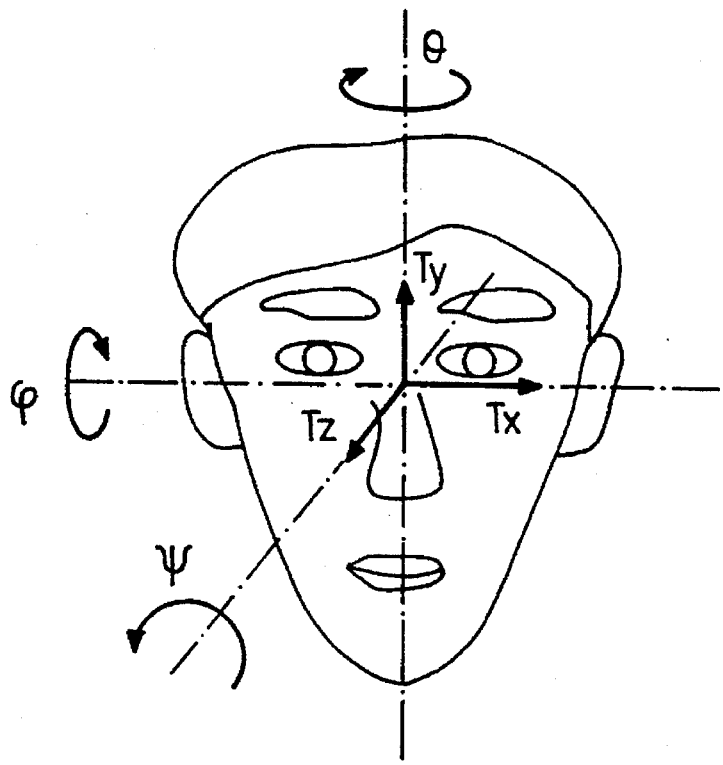

This device 300, which also receives (here through the commutator 250) the digital signals corresponding to the moving portion of the sequence of images and selected here by segmentation, comprises first of all a circuit 301 for determining the movement of the characteristic points of the tridimensional model previously constructed, which circuit must determine the translations and rotations of the face starting from this model information in order to be able eventually to code only those parameters which render it possible to find the correct position of the tridimensional model upon decoding. This description of movement in three dimensions means that the translatory and rotary movements of the model according to the six degrees of freedom shown in FIG. 7 are to be determined, the translatory movements being referenced along the axes $T_x$, $T_y$, $T_z$ and the rotary movements by the angles $\phi$, $\theta$, $\psi$ relative to these respective axes.

Figure 8:
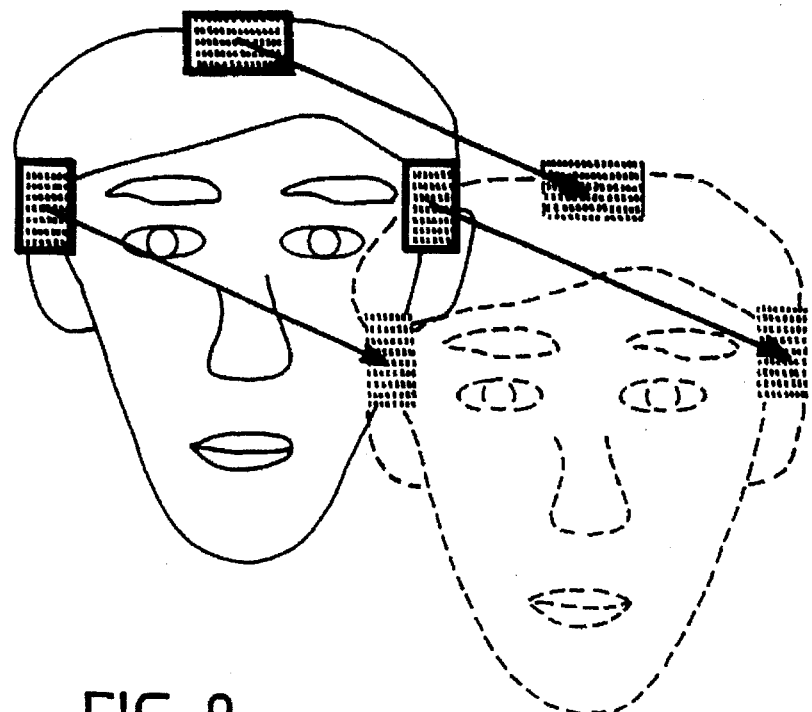
FIG. 8 illustrates the method of tracking the displacement of windows placed in characteristic zones of the face.

To determine the displacements $dx_i$, $dy_i$ of the various characteristic points i through translation and rotation, the displacement of the windows defined in characteristic zones of the face are followed as indicated in FIG. 8. Supposing that the person remains in the same plane throughout the sequence (to avoid having to take into account depth movements), the object is to find for each window of a given image, as shown in the said Figure, that one from among the windows which resembles it most inside a searching zone situated in the image following the said given image, by a resemblance criterion which is, for example, that of finding the minimum absolute error. For each characteristic point i, the displacements $dx_i$, $dy_i$ are finally given by the expressions:

$$dx_i = r(y_i).\cos\theta.d\theta + r(z_i).\cos\psi.d\psi + dTx$$

$$dy_i = r(x_i).\cos\phi.d\phi + r(z_i).\cos\psi.d\psi + dTy$$

in which $r(x_i)$, $r(y_i)$, $r(z_i)$ are the axes of rotation for a determined characteristic point i. When resolving this system of equations for the various characteristic points i, the parameters $d\phi(.)$, $d\theta(.)$, $d\psi(.)$, and $dT(.)$ are obtained, the absolute angles being already known from the preceding image. This extraction of parameters renders possible an updating of the tridimensional model so as to take into account any modifications in shape of the useful zone.

Figure 9:
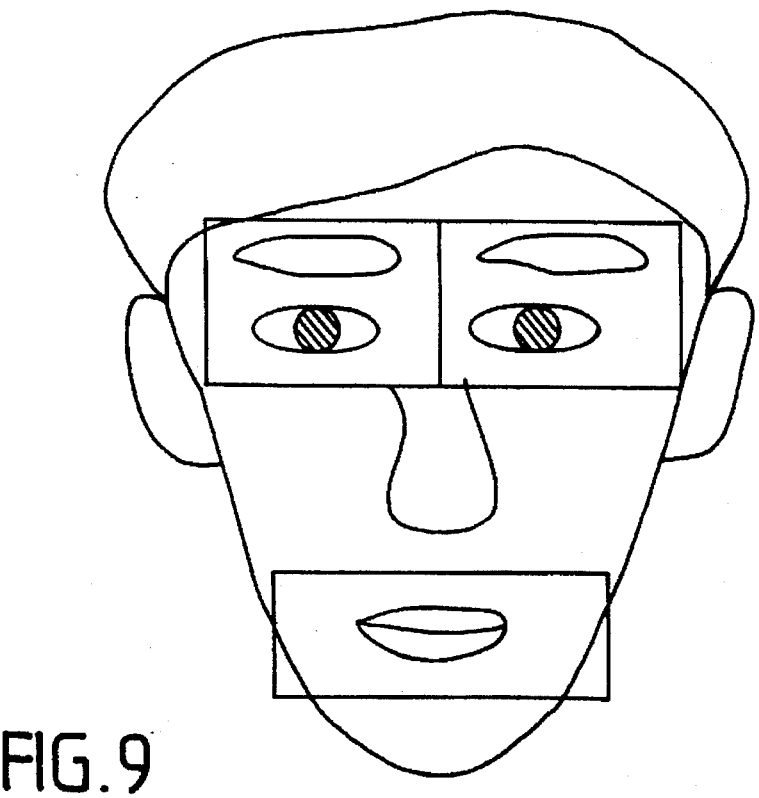
FIG. 9 shows the said face in the particular case in which three separate windows are retained so as to be subjected to a specific coding.

As we have seen, however, there are in this useful zone, in the face, zones of strong facial expression of which the representation must be as true to life as possible, for example, those of the mouth and of each eye. The final coding will take into account these zones of special interest which can be treated independently, or alternatively within a single window. A distinction of three separate windows was opted for here, as shown in FIG. 9, one for each eye and one for the mouth, and possibly including the nose and a portion of the cheeks, but the simplest option of a single window, here limited strictly to the eyes and the mouth, is also possible. These two options will be described below as carried out in either case by a circuit 302 for the selection of zones of particular interest and for the determination of their movements.

In the case of a single window, the coordinates of the upper left-hand corner written ($x_G$, $y_G$) and those of the bottom right-hand corner ($x_D$, $y_D$) of the window are retained according to one of the three formats cited above (CIF, QCIF, or format 4/3), which gives, for example:

(a) format 4/3:

$$x_G = x_c(\text{left temple}) + \text{dist } x$$

$$y_G = y_c(\text{left eye}) - \text{dist } y_1$$

$$x_D = x_c(\text{right temple}) - \text{dist } x$$

$$y_D = y_c(\text{mouth}) + \text{dist } y_2$$

in which $x_c(.)$ and $y_c(.)$ represent the coordinates of the characteristic points, and fist x, dist $y_1$, fist $y_2$ are values which render it possible to adjust the window width (for this format are chosen: dist x=from 0 to 40 pixels, dist $y_1$=45, dist $y_2$=40).

(b) CIF and QCIF formats: defined in the same way as in the case about to be discussed for three separate windows.

In the case of three windows, the coordinates for each of the three formats are determined as follows:

(a) format 4/3:

(a$_1$) for the mouth (BO), the window is defined on the basis of the characteristic points of the mouth and the corners of the eyes, while all values given below, such as 20, 40 etc., correspond to examples which have been tested and verified:

$$x_G(BO) = x_c(\text{left eye, left corner})$$

$$y_G(BO) = y_c(\text{bottom of nose}) + 20$$

$$x_D(BO) = x_c(\text{right eye, right corner})$$

$$y_D(BO) = y_c(\text{mouth, bottom point}) + 40$$

(a$_2$) for the left eye (OG), the window is defined on the basis of the characteristic points of the temples and the eyes:

$$x_G(OG) = x_c(\text{left temple}) + 40$$

$$y_G(OG) = y_c(\text{left eye, left corner}) - 35$$

$$x_D(OG) = (x_c(\text{left temple}) + x_c(\text{right temple}))/2$$

$$y_D(OG) = y_c(\text{left eye, left corner}) + 35$$

(a$_3$) for the right eye (OD), the window is also defined on the basis of the characteristic points of the temples and the eyes:

$$x_G(OD) = (x_c(\text{left temple}) + x_c(\text{right temple}))/2$$

$$y_G(OD) = x_c(\text{right eye, right corner}) - 35$$

$$x_D(OD) = x_c(\text{right temple}) - 40$$

$$y_D(OD) = y_c(\text{right eye, right corner}) + 35$$

(b) in the CIF format, the window coordinates are given by the following equations (in which the expression "rel. window" designates the mouth window, left eye window, or right eye window, as applicable), as defined above for the 4/3 format:

$$x_G(CIF) = (x_G(\text{rel. window}) + 19)/2$$

$$y_G(CIF) = (y_G(\text{rel. window}) + 32)/2$$

$$x_D(CIF) = (x_D(\text{rel. window}) + 19)/2$$

$$y_D(CIF) = (y_D(\text{rel. window}) + 32)/2$$

(c) in the QCIF format, the window coordinates are given in similar manner by the following equations:

$$x_G(QCIF) = (x_G(\text{rel. window}) + 19)/4$$

$$y_G(QCIF) = (y_G(\text{rel. window}) + 32)/4$$

$$x_D(QCIF) = (x_D(\text{rel. window}) + 19)/4$$

$$y_D(QCIF) = (y_D(\text{rel. window}) + 32)/4$$

The width of the window(s) thus defined is subsequently adapted by rounding up to a multiple MUL of the width of the blocks which will be used for coding, for example, to the nearest higher integer number of blocks. The values $\Delta x$ and $\Delta y$ thus added to the real width of the window(s) lies between 0 and at most the width of one block or macroblock and are distributed equally on either side of the relevant window, which leads to new coordinates $X_G$, $Y_G$, $X_D$, $Y_D$:

$$X_G(\text{win}) = x_G(\text{win}) - \Delta x(\text{win})$$

$$Y_G(\text{win}) = y_G(\text{win}) + \Delta y(\text{win})$$

$$X_D(\text{win}) = x_D(\text{win}) + \Delta x(\text{win})$$

$$Y_D(\text{win}) = y_D(\text{win}) - \Delta y(\text{win})$$

Finally, when these windows are in the process of moving in a sequence of images, the coordinates of a window of a frame having number N are derived from the coordinates of the window defined in the frame having number (N−1) by the following expressions:

$$X_G(\text{win}_N) = X_G(\text{win}_{N-1}) - DEPL(x)_{N-1}$$

$$Y_G(\text{win}_N) = Y_G(\text{win}_{N-1}) - DEPL(y)_{N-1}$$

$$X_D(\text{win}_N) = X_D(\text{win}_{N-1}) - DEPL(x)_{N-1}$$

$$Y_D(\text{win}_N) = Y_D(\text{win}_{N-1}) - DEPL(y)_{N-1}$$

in which $DEPL(x)_{N-1}$, $DEPL(y)_{N-1}$ are the x- and y-components of the displacement of the frame N relative to the frame (N−1).

The updating of the useful information is thus achieved after the initial calibration in the manner just described. A coding step is yet to be carried out, as in the case of the said calibration, here the coding of the updating information. This step is performed in the coding device 400 by a circuit 431 for coding the output information of the circuit 301 which determines the movement of the characteristic points and by a circuit 432 for coding the output information of the circuit 302 which selects the zones of particular interest.

The circuit 431 sees to the coding of the previously calculated parameters for each characteristic point, i.e. d$\Theta$, d$\delta$, d$\psi$, dTx, dTy, DEPL(x), DEPL(y). These parameters are coded, for example in 5 bits in a given sequence so that they can always be retrieved in the same order. When the characteristic points are, as above, the left and right temple, the left and right eye, and the bottom points of the nose and mouth, the order of magnitude of the number of bits transmitted is approximately 95 bits per image in the example described.

The circuit 432 sees to the coding of the information present in the window(s) encompassing the zone(s) of special interest (the circuit 432 will be described below with reference to one window, but the general application to the case of several windows—three separate windows in the embodiment described above—is obvious). The position and width of the (each) window being accurately defined, the portion of the original image inscribed in these windows is stored in the memory, in which each image portion composed of i lines and j columns is called WIN (i,j), while the term "source image" denotes that portion of the original image which is included in the window and is about to be submitted to coding now.

Coding of this source image is realised here by a hybrid coding mode of a type according to standards MPEG and H261 (the MPEG standard—Moving Pictures Expert Group—and the H261 standard recommended by the CCITT are mentioned in the cited article from the journal IEEE Spectrum), such that a coding of information having the same spatial origin (intra-coding) and coding of information not having the same spatial origin (coding by prediction) are combined. In the so-called intra-coding, the coded information belongs to one and the same image, whereas in coding by prediction the prediction is called simple when the coding provides a compensation of a unidirectional movement starting from images preceding the one being coded (this is the case in standards H261 and MPEG), or it is called bidirectional when the coding provides a compensation of a bidirectional movement starting from images which precede and follow the one being coded (this is the case in the MPEG standard only). This coding principle for the source image is well adapted to the coding of zones of strong facial expression, which are the most interesting facial zones, but which are subject to the strongest displacements.

Figure 10:
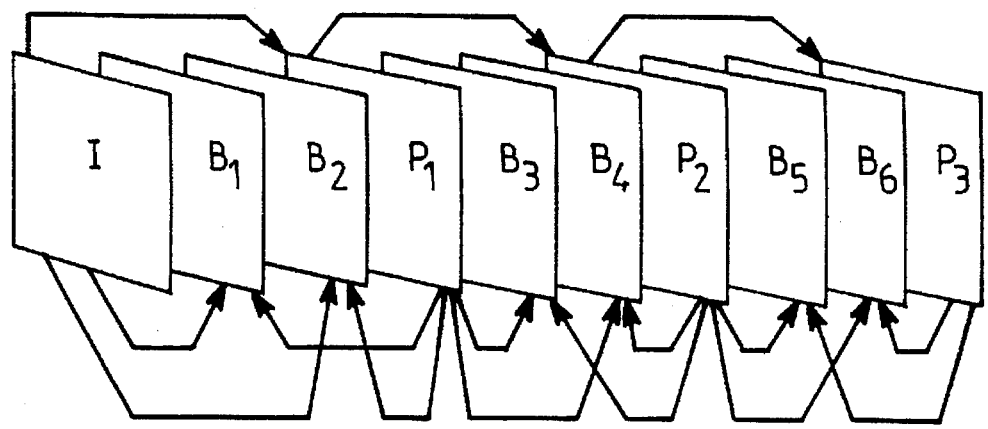
FIG. 10 shows a group of images in the sequence of original images to be coded, and indicates the manner in which these images are obtained through prediction as a function of one another.

For this coding of animated images it is thus necessary to store permanently, in the case of type H261 coding, the original images having numbers n and n−1, or, in the case described here referring to type MPEG coding, the original images having numbers n (=current image), n−1, n−2 and n−3, which is realised in the circuit 432. It is noted, moreover, that coding is carried out for groups of images, the successive groups forming the sequence of images resulting from the original takes. Each group of images is formed by a number N of images which lies, for example, between 8 and 16 and which always starts with an intra-coded image. FIG. 10 shows an example of such a group with N=10, in which the images $P_3$, $P_2$, $P_1$ are derived from the images $P_2$, $P_1$ and I (initial image which was intra-coded), respectively, by simple prediction, whereas the images $B_1$ to $B_6$, are each derived from an earlier image and from a later image by bidirectional prediction ($B_1$ and $B_2$ are derived from I and $P_2$; $B_3$ and $B_4$ from $P_1$ and $P_2$; $B_5$ and $B_6$ from $P_2$ and $P_3$). The arrows in FIG. 10 serve to show this simple or bidirectional method of prediction. These details being given, this coding of animated images will not be described any further, since it has been described in various documents, as was noted, especially the article "Video compression makes big gains" cited above (IEEE Spectrum, October 1991, vol. 28, no. 10, pp. 16–19).

These specific codings of the moving tridimensional model and of the windows of special interest being thus provided by the circuits 431 and 432, it should be noted that the specific information coded is of various origins: that coded by the circuit 431 is, at a given moment, information of the same spatial origin (periodic output of the coordinates of the characteristic points of the model), whereas that coded by the circuit 432 was seen to be of a more complex origin (intra-coded images, images obtained by simple prediction, interpolated images obtained by bidirectional prediction).

Moreover, it will be noted that the luminance values inside and outside the windows need not necessarily coincide on account of the choice of luminance values I(AMB) and I(INC) made for determining the shadow effect of the tridimensional model. In fact, this choice need not necessarily reflect the illumination characteristics obtaining while the recording is made, and the superposition of any kind of the coded window(s) over the composed image obtained from the adaptation of the characteristic points of the tridimensional model makes the borderline between the two regions apparent because of this difference in illumination.

To avoid this luminance shift between the synthesis image and the image in the windows, the coding and decoding assembly to which the present description relates provides a correction for this, and this correction in the relevant window(s) may be carded out either in the videophone image decoding system, or in the coding system. In the former case, the coding device 400 need not provide the said correction. In the latter case, the coding device 400 comprises a luminance shift correction circuit 433 which operates as follows.

This circuit 433 first determines a so-called effective zone inscribed in each window and containing the actual composed image so as to exclude those portions of windows which may lie outside the face itself (an example of such an outregion on either side of the mouth is shown in FIG. 9). It is avoided thereby that a zone not belonging to the face is taken into account, whose luminance (very different from that of the face pixels) would falsify the eventual calculations. This effective zone is here delimited in the x and y-direction in the following manner:

(a) in the x-direction: on the left, by an abscissa value written x(MIN) equal either to the abscissa of the outermost left edge of the window considered, or, if the window runs outside the face, to the abscissa of the first pixel which is not zero of the composed image starting from the left-hand edge of this window and, on the right, by an abscissa value written x(MAX) which in a similar manner is equal either to the abscissa of the outermost right-hand edge of the window considered or, if the window extends outside the face, to the abscissa of the first pixel which is not zero of the composed image starting from the right-hand edge of this window;

(b) in the y-direction: at the upper side, by an ordinate value written y(MAX) which is that of the upper edge of the window considered and, at the lower side, by an ordinate value written y(MIN) which is that of the lower edge of the window.

After this effective zone has been defined, the circuit 433 calculates the average luminance shift between the image source in the window considered and the composed image. This calculation is carried out in a small zone, generally square, situated in a luminance zone which is comparatively uniform for each window both for the composed image and for the image in the window, thus avoiding zones rich in contours or contrasts such as the immediate surroundings of the eyes and the mouth (in such zones, the source images and composed images are very different and the estimation of an overall luminance shift for the entire window under consideration would not be significant anymore).

Figure 11:
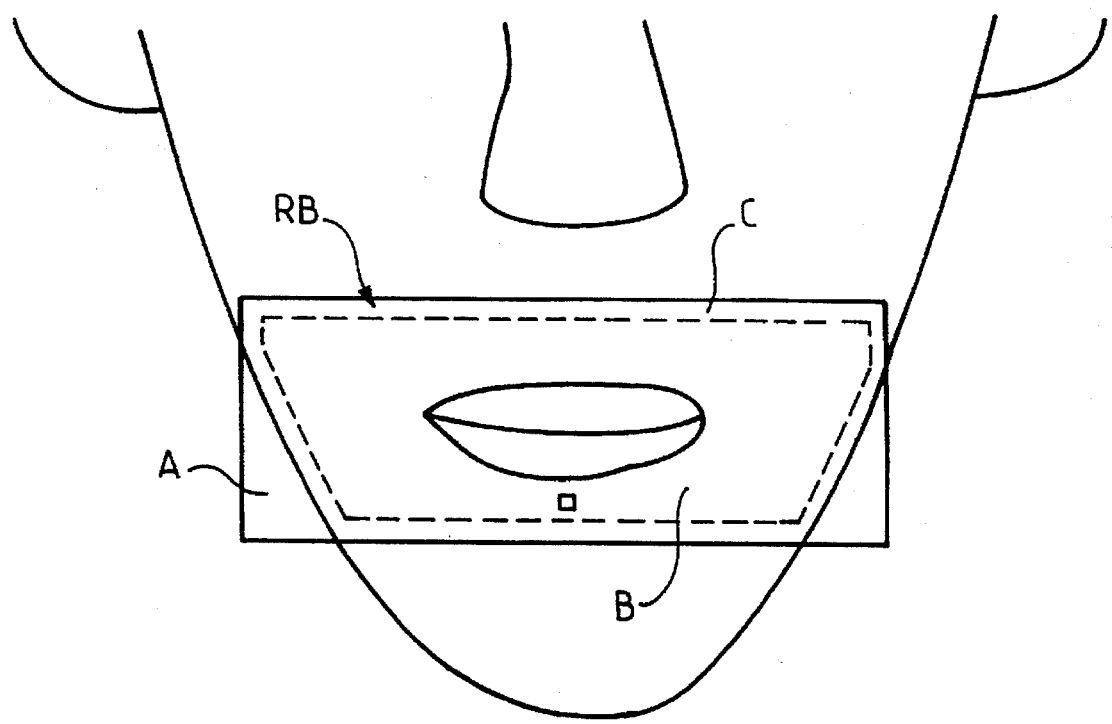
FIGS. 11, 12, 13 show three examples of transition zones between the said windows and the remainder of the image to be coded.
Figure 12:
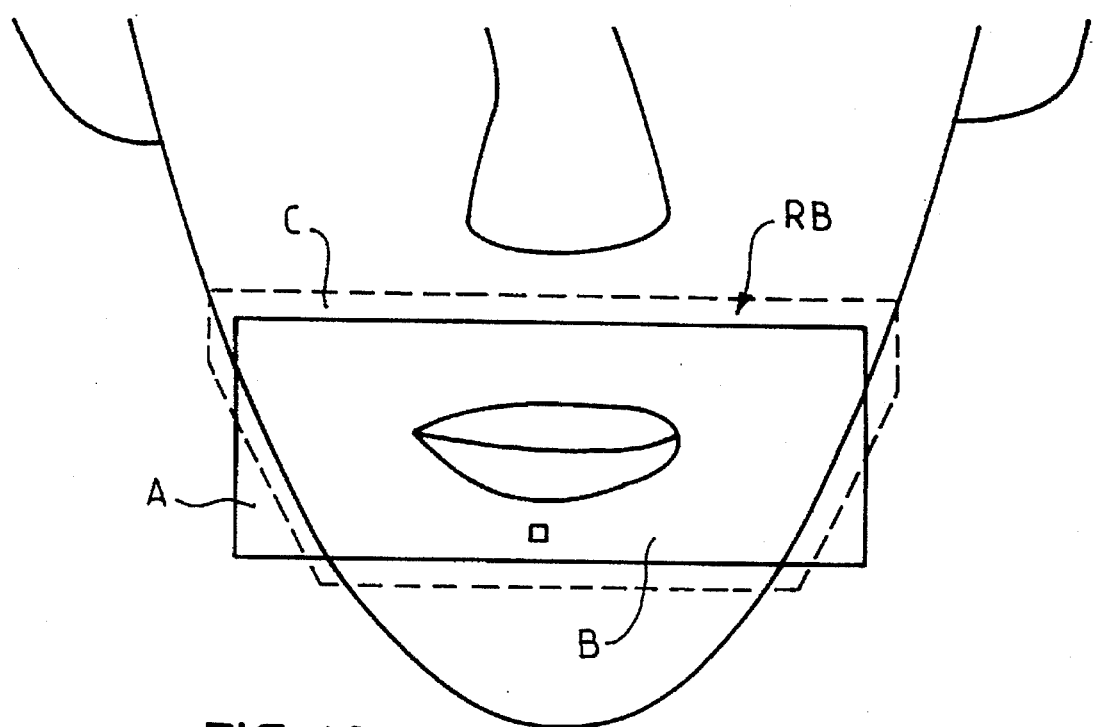
Figure 13:
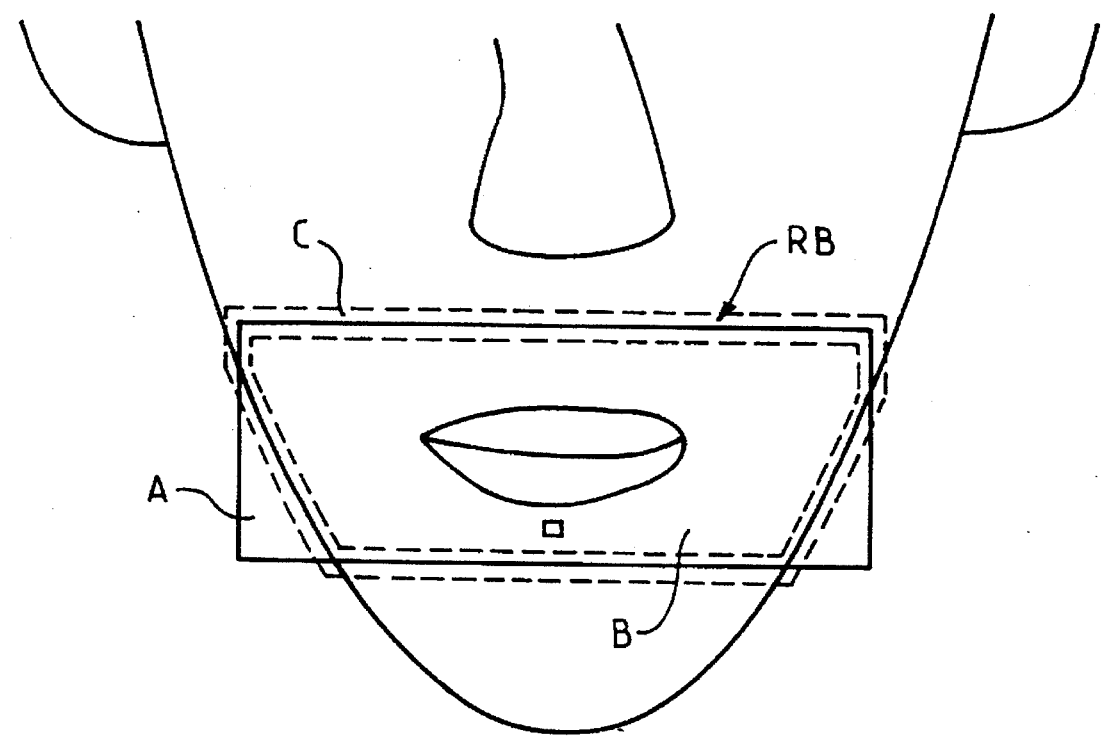

The small zone taken here is a square of a few pixels (2 pixels in the CIF or QCIF format, 5 pixels in the 4/3 format) situated low in the centre of the window, a position where the luminance is effectively fairly uniform (see FIGS. 11 to 13). The average luminance in this square of the source image is written I(SOURCE) and the average luminance in the same square but detected in the composed image is written I(SYNTH). The difference between these luminance values then indicates the average shift between the two images for the window considered, written OFFSET(f), according to the following expression:

$$OFFSET(f) = \left[ \sum_{1}^{n} (I(SOURCE) - I(SYNTH)) \right] / n$$

in which n is the number of pixels in the small zone considered, here square, and f refers to the window in question. The average shift thus calculated is adopted for the entire window.

The correction of the luminance shift to be carried out (by the circuit 433) may then be realised; see FIGS. 11 to 13 and the corresponding description below. First a fringe region RB is defined of a width of a few pixels (here 5, 3, or 10 pixels, depending on whether the CIF, QCIF or 4/3 format is involved), which runs all along the edge of each window and which forms a transition zone in which the luminance will be made to vary, here in linear fashion, thus creating a kind of gradient. This transition zone, in the embodiment described here, is a ship whose edges are parallel to the border of the window and which is preferably situated entirely inside the relevant window, as shown in FIG. 11. Alternatively, however, this ship may be situated entirely outside the window, as shown in FIG. 12, or may straddle the edge of the window, as shown in FIG. 13.

In the first case, the luminance in the window after correction is given by the following expression:

$$I_1(WIN/CORR) = I(SOURCE)_{i,j} + VALCOR$$

in which:

$I_1(WIN/CORR)$ is the corrected luminance value;

$I(SOURCE)_{i,j}$ is the value of the luminance of the source image at the coordinate point (i,j) considered in the said transition zone;

VALCOR is the shift correction value which must be considered with its sign (the composed image outside the window may be more or less luminous than the source image), and which takes different values written $VALCOR_1$, $VALCOR_2$, $VALCOR_3$ depending on the point (i,j) considered:

(a) outside the zone of the face (zone A in FIG. 11), this value is given for each point by:

$$VALCOR_1 = I(SYNTH)_{i,j} - I(SOURCE)_{i,j}$$

(b) in the entire zone of the window (zone B) which is inside the interior limit of the transition zone (except the points which may already be outside the face zone and are thus treated in accordance with (a) above) this value is constant and given by:

$$VALCOR_2 = OFFSET(f)$$

(c) between the said interior limit of the transition zone and the edge of the window (zone C), the value $VALCOR_3$ varies linearly between these two values $VALCOR_2$ and $VALCOR_1$.

In fact, the edges of the windows are parallel to the defined x- and y-axis here, and the said variation in this case is a linear variation with the sole horizontal coordinate x when it takes place along the lateral edges on the left and right of the window, or a linear variation with the sole vertical coordinate y when it takes place along the lower and upper edges of the window. In the second case (FIG. 12) or in the third case (FIG. 3), we have a calculation which is substantially similar and which renders it possible to determine the correction value to be applied to the luminance (the zones A, B, C are defined in a similar manner). It will then finally be stipulated that the average shift OFFSET(f) in general will vary only comparatively little from one window to another. This difference will, however, be perceptible and unaesthetic in the image as finally reconstructed, and it is preferable to choose a same average offset value for each of the windows, for example, by taking their average, and by discarding from the calculation of this average any one of the average shift values which is strongly different from the others, if applicable.

The luminance correction being thus completed, the circuit 432 of the coding device 400 will henceforth provide in the window(s) instead of the coding of the luminance values of the source image the coding of these corrected values as described above. It then remains to ensure a suitable sequential presentation of the coded information at the output of the coding device 400 towards the transmission and/or storage canal CL shown in FIG. 1, for example, in the following order: signals indicating that the calibration phase or the updating phase obtains, characteristic coding parameters for the tridimensional model, specific coding parameters for the windows, signal indicating end of image, etc. Such a sequential presentation operation, called formatting, is of a classic type and will not be described in any detail, while substantial variations in the presentation of the coded data do not in any way affect the operating principles described above.

The coding means described up to the present point are sufficient for providing eventually, at the decoding end, an image reconstruction of satisfactory quality as long as the person in the sequence of images is seen en face or at a small angle. In fact, the luminance shift correction at the border between the two zones of the useful portion of the images wipes out any inequalities in the restored image which could result from this combination of two distinct coding principles within one and the same image.

Figure 14:
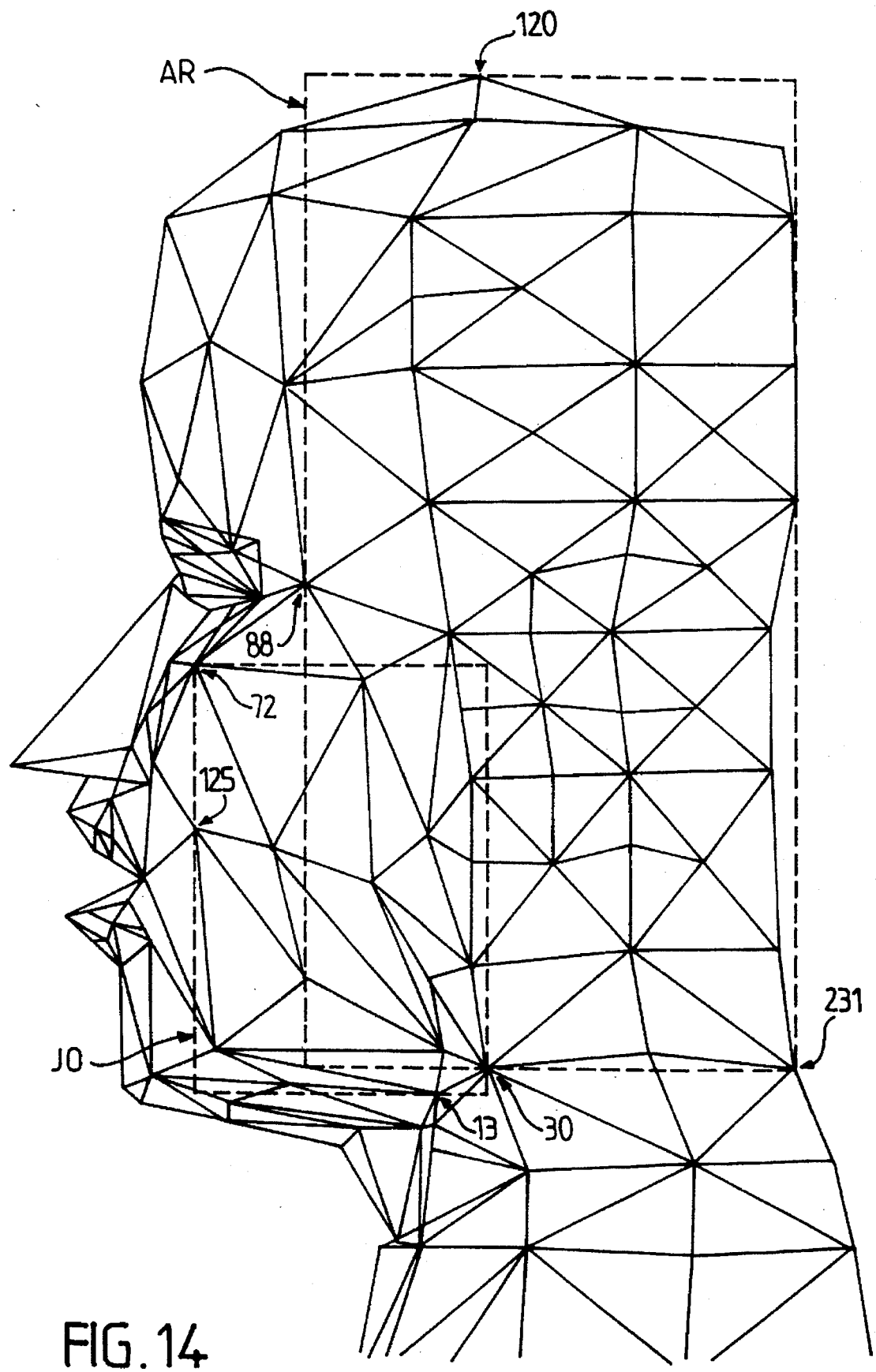
FIG. 14 represents the tridimensional model viewed in profile, and shows more particularly two zones of this model which have been partly or completely excluded from the initial calibration.

On the other hand, a degradation of another portion of the image may be observed under certain circumstances: the tridimensional model initially calibrated is not sufficiently precise at the transition between the fixed background of the image and the moving person for adapting itself to movements of this person when the latter performs major rotations of the head, for example, rotations (about a vertical axis) of more than 15° to the left or right. Lateral facets may indeed appear, including the ears, the back of the head, and the initial calibration has not taken into account information on these items. Moreover, certain facets situated on the cheeks may render the transmission of novel information necessary. FIG. 14 in particular shows these two zones in the tridimensional model seen en profil, the zone AR including the ears and the hair and the zone JO including the cheeks.

To remedy this local degradation of image quality, a refresh operation may be proposed, with the preliminary note that this refresh must be carded out with a frequency which represents a compromise between the image quality (which requires frequent refreshes) and the volume of data to be transmitted (which must be reduced to a minimum, so that the refreshes should be spaced apart as widely as possible). It was seen above that the calibration of the tridimensional model consisted in achieving an adjustment against the original images at the start of the sequence, and based on the nodes and facets of this base model, completed by the application of a shadow effect, and that the composed image which can be finally obtained was then defined for each model facet by the product of a texture coefficient CT and the illumination value $I_{OMB}(F)$ belonging to this facet F, the texture coefficient being itself defined on the basis of the original image seen en face.

This definition of the synthesis image for a facet F is contained in the following expression:

$$I(SYNTH)_F = I_{OMB}(F) \times CT(F)$$

and that of CT(F) in the following expression:

$$CT(F) = I(SOURCE)_F / I_{OMB}(F)$$

The texture coefficients corresponding to hidden facets or to certain lateral facets which are strongly changed during major rotations of the head are not known. To determine them, a periodic repeat of the initial calibration could be carried out, but it will be observed in that case that progressive discontinuities in luminance between adjoining facets become apparent.

The coding subassembly then comprises, to solve this problem, a calibration correction device 500 shown in FIG. 1 and in its turn comprising on the one hand means 510 for detecting luminance differences (or chrominance differences, as applicable) between the composed image and the original image, on the other hand means 520 for refreshing data in dependence on the results of the said detection, and finally, within the coding device 400, means 530 for coding new information thus obtained. These means 510 to 530 constitute an autonomous block which is not necessarily provided under all circumstances, but only in the particular application mentioned above for remedying the degradation of the image quality which can be observed in this application.

In a first embodiment, the detection means 510 comprise a circuit for calculating the average error between the composed image and the original image. This average error $ERR_M(.)$ is evaluated for each image in accordance with the following expression:

$$ERR_M(ZC) = \sum_{1}^{N_F} \sum_{1}^{N_P} (I(SYNTH)_{F(i)} - I(SOURCE)_{F(i)})^2 / N_P$$

in which ZC is the relevant zone (in the present case the zone AR or the zone JO), $N_F$ is the number of facets in this zone, and $N_P$ the number of pixels of the facet concerned F(i). If no refresh were provided, the average error would increase proportionally with the appearance of the lateral facets, and would be at its maximum when these facets showed the greatest surface area. The decision whether or not to carry out such a refresh operation is taken here by comparing this average error to a threshold THRE5: if the average error $ERR_M(ZC)$ is greater than that, the refresh takes place for this zone by means of a new transmission of texture parameters. When this transmission is completed, the average error decreases and a subsequent transmission of new texture parameters will not be necessary unless very large rotations are concerned. The threshold THRE5 is adjusted so as to fit the desired compromise between the desired image quality and the data volume to be transmitted.

In a second embodiment, the detection means 510 comprise an angle detection circuit: a refresh operation takes place or not depending on the orientation of the facets of the model as a result of the rotation (through an angle θ) about the vertical axis. It is found for the facets at the side of the head and the ears (zone AR) that in general at least two refresh operations are necessary, one for a moderate angle of the order of, for example, 20°, the other for an angle of approximately 35° if the shape of the ears is to be satisfactory described in the case of a face. The information in the zone JO is less rich in contours and textures, and a single refresh may be sufficient at about 35°.

In a third embodiment, the detection means 510 comprise a circuit for calculating the ratio, for a given facet, between the number of texture coefficients determined through interpolation of the initial values of these texture coefficients and the number of these initial texture coefficients, or rather of the average ratio thus established for the total of facets within a zone considered (zone AR or zone JO).

The decision to correct the calibration, also called refresh decision, being thus taken, it is necessary to ensure the coding of this refresh information, if present. This coding will now be described, for example, for the case in which the texture coefficients are not coded in the coding subassembly but redefined in the decoding subassembly on the basis of the coding of a portion of the original (or source) image. Here again, it is possible to distinguish, for example, the case of the zone AR (ears+hair of the back of the head) and that of the zone JO (cheeks).

The zone to be refreshed in the zone AR is delimited by means of a substantially rectangular window inside which a DCT type coding will be carried out. The coordinates chosen for the window are defined, for example, as indicated in FIG. 14 by the extreme points of the zone to be refreshed, i.e. the following points in the case shown:

point extreme left $P_{EG}$:
   $x_{EG} = x(88)$
extreme upper point $P_{ES}$:
   $y_{ES} = Y(120)$
point extreme right $P_{ED}$:
$X_{ED} = x(231)$
extreme bottom point $P_{EI}$:
   $y_{EI} = y(231)$ in which x(.), y(.) represent the abscissa and the ordinate, respectively, of the point in FIG. 14 having the number indicated between parentheses among the totality of nodes of the model thus numbered (the numbers of the other nodes, however, have not been indicated so as not to clutter up the Figure).

The width of the window thus defined is subsequently adapted to a multiple of the width of the blocks (here blocks of 8×8 pixels) used for the DCT coding by rounding up to an integer number of blocks, here to the next higher integer as before. Coding is then carried out (type JPEG coding, with DCT transform), an order of magnitude of the cost of coding being given by the following Table for the various formats considered in the present description:

|  | θ = | 15° | 30° |
|---|---|---|---|
| Before coding: | CIF (bytes) | 4500 | 7400 |
| Before coding: | QCIF (bytes) | 1150 | 1800 |
| After coding: | CIF (bits) | 1916 | 4400 |
| After coding: | QCIF (bits) | 1500 | 2340 |
| Transmission time: | CIF (seconds) | 0.3 | 0.6 |
| Transmission time: | QCIF (seconds) | 0.2 | 0.3 |

The values given above are obviously only indicative for tests carried out, the coding toll for the CIF windows being estimated at approximately 0.6 bit/pixel and that for the QCIF windows at approximately 1.3 bit/pixel. The transmission time values were determined on the basis of a transmission speed of 7 kbits/second for an image. To ensure this transmission rapidly, the refresh data are given priority temporarily in that the transmission of coding bits is stopped as long as this refresh operation takes place, and is re-established thereafter. This interruption in transmission affects a given, limited number of images, for example six images, which correspond to an interruption of the order of 0.6 second. Obviously, it is necessary to indicate which phase obtains, and a mode indicator parameter placed at the head of the data provides this information, for example, taking the value 1 when a refresh is going on and the value 0 when there is no refresh or when the latter has been completed.

The procedure is similar for the zone JO, a substantially rectangular window being again delimited, as indicated in FIG. 14, by the coordinates of its extreme points defined as above, for example in this case:

point extreme left $P_{EG}$:

$x_{EG}=x(125)$ extreme upper point $P_{ES}$:

$y_{ES}=y(72)$ point extreme right $P_{ED}$:

$x_{ED}=x(30)$ extreme bottom point $P_{EI}$:

$y_{EI}=y(13)$

The adaptation of the width of the window and its coding are then carried out as indicated above, and an indicative estimate of the coding toll is given below:

|  | $\theta =$ | 15° | 30° |
| --- | --- | --- | --- |
| Before coding: | CIF (bytes) | 3200 | 3800 |
| Before coding: | QCIF (bytes) | 800 | 950 |
| After coding: | CIF (bits) | 1920 | 2270 |
| After coding: | QCIF (bits) | 1040 | 1230 |
| Transmission time: | CIF (seconds) | 0.27 | 0.3 |
| Transmission time: | QCIF (seconds) | 0.15 | 0.17 |

Although reduced compared with the case of the zone AR, the transmission times may still appear to be considerable here when the luminance (or chrominance) on the cheeks is comparatively even. It would then be possible to describe the intensity on each facet by a linear interpolation between the intensities at three tips of the facet considered. The luminance I(PIXEL) in any point inside a facet is then expressed as a function of its position relative to the left and right edges of the facet according to an expression of the type:

$$I(PIXEL)=aL+bR$$

in which a and b are coefficients and L and R the intensities interpolated at the left and right edge, respectively, which intensities are in their turn connected with three intensities at the ends of the edges. This possibility of interpolation renders it possible to code and transmit only the intensities of the said ends of the edges and thus leads to a considerable decrease in the coding toll (for example, if the intensities on 15 facets are interpolated on the basis of the intensities at 13 edge ends, the coding toll is 13×8=104 bits against 2000 bits if no interpolation takes place, so a factor 20).

We claim:

1. An apparatus for producing segmentation images of a pattern moving against a background, said images being in the form of digital signals corresponding to luminance or color information for respective pixels along scanned lines, comprising:

means for determining a silhouette of a useful zone, including:

1) means for calculating differences in luminance of pixels of a present image and pixels of at least one image of a sequence of images preceding the present image, 2) means for determining respective comparisons of said differences with a threshold, and 3) means, responsive to the respective comparisons, for generating a binary image wherein each pixel is assigned a respective one of two luminance values, the two luminance values respectively representing said background and said useful zone, means for suppressing irregularities which may affect said useful zone, including 1) means for determining an inclination of the contour between the useful zone and said background relative to a line being currently scanned, 2) a contour regularizing circuit for suppressing irregularities in a contour of said silhouette by delimiting, for each scanned line crossing said useful zone, a segment belonging to said useful zone, said circuit determining a correlation between the respective inclination for the line being currently scanned and the delimited segment on the line preceding the line being currently scanned, and 3) means for adopting a uniform luminance value inside said segment equal to a predetermined value, and means, responsive to said silhouette and said means for suppressing irregularities, for forming a segmentation image having a uniform background and a representation of said pattern derived from said present image and said sequence of images.

2. An apparatus as claimed in claim 1, characterized in that said means for determining an inclination compares discontinuity values between two successive lines through the useful zone.

3. An apparatus as claimed in claim 1, characterized in that said one image is spaced from said present image by at least one other image of said sequence, luminance of pixels of said one other image not being used in the calculation of said differences.

4. An apparatus as claimed in claim 1, characterized in that said means for suppressing irregularities comprises:

a noise suppression circuit connected to an output of said means for determining a silhouette, for suppressing noise in a zone of said binary image corresponding to said background, and preceding an input of said means for forming, an irregularity suppression circuit for suppressing irregularities in the contour separating said useful zone and said background, said noise suppression and irregularity suppression circuits comprising means for calculating an average for an environment of a pixel being considered, for comparing said average with a predetermined luminance threshold, and for taking a majority decision as to the binary value adopted for the luminance of said pixel being considered.

5. An apparatus as claimed in claim 4, characterized in that said predetermined value is the maximum value on a scale of luminance levels.

6. An apparatus as claimed in claim 1, characterized in that said means for forming comprises a substitution circuit for substituting, for said binary image, an image in shades of grey or color without background, and a circuit for suppressing effects of movement between said present image and the first of the images of said sequence of images.

7. An apparatus as claimed in claim 6, characterized in that said one image is spaced from said present image by at least one other image of said sequence, luminance of pixels of said one other image not being used in the calculation of said differences.

8. An apparatus for producing segmentation images of a pattern moving against a background, said images being in the form of digital signals corresponding to luminance or color information for respective pixels along scanned lines, comprising:

means for determining a silhouette of a useful zone, including:
1) means for calculating differences in luminance of individual pixels of a present image and corresponding individual pixels of a plurality of images from a sequence of images preceding the present image, said present image and each image of said plurality being spaced from each other by at least one respective other image of said sequence, luminance of pixels of said respective other images not being used in the calculation of said differences,
2) means for determining respective comparisons of said differences with a threshold, and
3) means, responsive to the respective comparisons, for generating a binary image wherein each pixel is assigned a respective one of two luminance values, the two luminance values respectively representing said background and said useful zone, means for suppressing irregularities which may affect said useful zone, including
1) means for determining an inclination of the contour between the useful zone and said background relative to a line being currently scanned,
2) a contour regularizing circuit for suppressing irregularities in a contour of said silhouette by delimiting, for each scanned line crossing said useful zone, a segment belonging to said useful zone, said circuit determining a correlation between the respective inclination for the line being currently scanned and the delimited segment on the line preceding the line being currently scanned, and
3) means for adopting a uniform luminance value inside said segment equal to a predetermined value, and means, responsive to said silhouette and said means for suppressing irregularities, for forming a segmentation image having a uniform background and a representation of said pattern derived from said present image and said sequence of images.

9. An apparatus as claimed in claim 8, characterized in that said means for determining an inclination compares discontinuity values between two successive lines through the useful zone.

10. An apparatus as claimed in claim 8, characterized in that said means for suppressing irregularities comprises a noise suppression circuit connected to an output of said means for determining a silhouette, for suppressing noise in a zone of said binary image corresponding to said background, and preceding an input of said means for forming, an irregularity suppression circuit for suppressing irregularities in the contour separating said useful zone and said background, said noise suppression and irregularity suppression circuits comprising means for calculating an average for an environment of a pixel being considered, for comparing said average with a predetermined luminance threshold, and for taking a majority decision as to the binary value adopted for the luminance of said pixel being considered.

11. An apparatus as claimed in claim 10, characterized in that said means for forming comprises a substitution circuit for substituting, for said binary image, an image in shades of grey or color without background, and a circuit for suppressing effects of movement between said present image and the first of the images of said sequence of images.

12. An apparatus as claimed in claim 11, characterized in that said predetermined value is the maximum value on a scale of luminance levels.

13. An apparatus as claimed in claim 8, characterized in that said means for forming comprises a substitution circuit for substituting, for said binary image, an image in shades of grey or color without background, and a circuit for suppressing effects of movement between said present image and the first of the images of said sequence of images.

14. An apparatus as claimed in claim 13, characterized in that said means for determining an inclination compares discontinuity values between two successive lines through the useful zone.

15. An apparatus for producing, in the form of digital signals corresponding to luminance or color information, segmentation images of a pattern moving against a background, comprising:

means for determining a silhouette of a useful zone, said silhouette having a contour, and said means for determining including means for determining signal differences between a present image and a previous image, and means, responsive to said means for determining signal differences, for generating a binary image, means for suppressing irregularities which may affect said useful zone, and means, responsive to said silhouette and said means for suppressing, for forming a segmentation image having a uniform background and a representation of said pattern, said means for suppressing including a contour regularizing circuit for delimiting, for each scanned line crossing said useful zone, a segment belonging to said useful zone by determining a correlation between delimitation of a segment on the line preceding the line being currently scanned and inclination of the contour between the useful zone and said background relative to said line being currently scanned.

16. An apparatus as claimed in claim 15, characterized in that said means for suppressing irregularities comprises means for adopting a uniform luminance value inside said segment equal to a predetermined value.

17. An apparatus as claimed in claim 15, characterized in that said means for suppressing irregularities comprises a noise suppression circuit connected to an output of said means for determining a silhouette, for suppressing noise in a zone of said binary image corresponding to said background, and preceding an input of said means for forming, an irregularity suppression circuit for suppressing irregularities in the contour separating said useful zone and said background, said noise suppression and irregularity suppression circuits comprising means for calculating an average for an environment of a pixel being considered, for comparing said average with a predetermined luminance threshold, and for taking a majority decision as to the binary value adopted for the luminance of said pixel being considered.

18. An apparatus as claimed in claim 16, characterized in that said predetermined value is the maximum value on a scale of luminance levels.

19. An apparatus as claimed in claim 15, characterized in that said means for forming comprises a substitution circuit for substituting, for said binary image, an image in shades of grey or color without background, and a circuit for suppressing effects of movement between said present image and the first of the images of said sequence of images.

20. An apparatus as claimed in claim 15, characterized in that said means for suppressing irregularities includes:

1) means for determining an inclination of the contour between the useful zone and said background relative to a line being currently scanned, 2) a contour regularizing circuit for suppressing irregularities in a contour of said silhouette by delimiting, for each scanned line crossing said useful zone, a segment belonging to said useful zone, said circuit determining a correlation between the respective inclination for the line being currently scanned and the delimited segment on the line preceding the line being currently scanned, and 3) means for adopting a uniform luminance value inside said segment equal to a predetermined value.

21. An apparatus as claimed in claim 20, characterized in that said means for determining an inclination compares discontinuity values between two successive lines through the useful zone.

* * * * *